United States Patent
von Lignau

(10) Patent No.: US 8,408,151 B2
(45) Date of Patent: Apr. 2, 2013

(54) WATERCRAFT HULL AND ASSOCIATED METHODS

(75) Inventor: Alexander von Lignau, Fermathe (HT)

(73) Assignee: Alexander von Lignau, Fermathe (HT)

(*) Notice: Subject to any disclaimer, the term of this patent is extended or adjusted under 35 U.S.C. 154(b) by 230 days.

(21) Appl. No.: 12/977,885

(22) Filed: Dec. 23, 2010

(65) Prior Publication Data

US 2011/0146555 A1  Jun. 23, 2011

Related U.S. Application Data

(60) Provisional application No. 61/289,760, filed on Dec. 23, 2009.

(51) Int. Cl.
*B63B 1/00* (2006.01)
(52) U.S. Cl. .................................................. 114/61.3
(58) Field of Classification Search ................ 114/56.1, 114/61.27, 61.29, 61.3, 61.31, 61.32, 61.33, 114/140, 271, 288
See application file for complete search history.

(56) References Cited

U.S. PATENT DOCUMENTS

| | | | |
|---|---|---|---|
| 3,051,115 A * | 8/1962 | Canazzi | 114/288 |
| 3,363,598 A | 1/1968 | Mortrude | |
| 4,004,542 A | 1/1977 | Holmes | |
| 4,022,143 A | 5/1977 | Krenzler | |
| 4,091,761 A | 5/1978 | Fehn | |
| 4,465,009 A | 8/1984 | Wood et al. | |
| 4,584,959 A * | 4/1986 | Allison | 114/288 |
| 5,850,793 A * | 12/1998 | Bronson | 114/67 A |
| 5,983,823 A * | 11/1999 | Allison | 114/271 |
| RE36,879 E | 9/2000 | Schoell | |
| 6,237,522 B1 | 5/2001 | Kiyohara et al. | |
| 6,318,286 B1 | 11/2001 | Nakashima et al. | |
| 6,631,690 B2 | 10/2003 | Mambretti | |
| 6,923,137 B2 * | 8/2005 | Waits, Jr. | 114/288 |
| 7,240,632 B1 | 7/2007 | Wynne et al. | |
| 2002/0144639 A1 * | 10/2002 | Scarcella | 114/288 |
| 2003/0226491 A1 * | 12/2003 | Waits, Jr. | 114/288 |
| 2005/0166824 A1 * | 8/2005 | Waits, Jr. | 114/288 |
| 2009/0188419 A1 | 7/2009 | Lindstrom et al. | |

* cited by examiner

*Primary Examiner* — Daniel Venne
(74) *Attorney, Agent, or Firm* — Mark R. Malek, Esq.; G. Philip J. Zies, Esq.; Zies Widerman & Malek

(57) ABSTRACT

A watercraft hull includes a lower portion, an upper portion, and a strake positioned between the lower portion and the upper portion. The lower portion may include a bow portion having a v-shape defined by a keel and sidewalls extending upwardly therefrom to the strake and an aft portion having a tunnel formed therein. The aft portion may be defined by a pair of opposing sidewalls extending downwardly from the strake to a bottom portion. The tunnel may be defined by a pair of opposing tunnel sidewalls that extend upwardly from the bottom portion to a tunnel top having a center rib. The lower portion may also include a medial portion that transitions the bow portion to the aft portion. The medial portion may have a vacuum chamber extending between and transitioning the keel of the bow portion to the tunnel formed in the aft portion.

17 Claims, 4 Drawing Sheets

WATERCRAFT HULL AND ASSOCIATED METHODS

RELATED APPLICATIONS

The present application claims the benefit of U.S. Provisional Patent Application Ser. No. 61/289,760 titled HIGH PRESSURE DEEP VEE TUNNEL HULL AND ASSOCIATED METHODS filed by the inventor of the present invention on Dec. 23, 2009, the entire contents of which are incorporated herein by reference.

FIELD OF THE INVENTION

The present invention relates to the field of watercraft hulls and, more specifically, to the field of watercraft hull shapes and associated methods.

BACKGROUND OF THE INVENTION

For as long as humans have piloted watercraft over bodies of water, humans have attempted to improve the design of their watercraft hulls. Historically, watercraft hulls have been in three well known classes: flat-bottomed planing hulls, deep vee hulls, and tunnel hulls. Each class of historical hull has associated with its shape certain advantages and certain disadvantages. Flat-bottomed planing hulls encounter minimal resistance with the water surface, but can be directionally unstable. Deep vee hulls can be directionally stable, but have increased water friction. Tunnel hulls can also be directionally stable, but may have a tendency to have an excessive angle of inclination and can be susceptible to tail or head winds. None of these historical watercraft hull shapes provides minimal water resistance together with directional stability and an acceptable angle of inclination not susceptible to tail or head winds.

There are several watercraft hull shapes that have attempted to solve this problem. For example, U.S. Pat. No. 3,363,598 to Mortrude, discloses a watercraft hull shape for minimizing frictional resistance, maximizing ride quality and increasing directional stability. The design includes a deep vee hull shape with a flat delta-shaped planing surface along the keel line. The delta-shaped planing surface is situated so that the apex thereof is oriented toward the bow and increases in width as it approaches the stern.

U.S. Pat. No. 4,022,143 to Krenzler discloses a watercraft hull shape which combines hydrodynamic efficiency and seaworthiness. The design includes a transom stern, freeboard side portions and a wide-keeled lower hull portion which comprises keel sidewalls forming steep, relatively constant deadrise angles and keel bottom surfaces which are flat at the transom and progress forwardly to form shallow deadrise angles. First steps having shallow deadrise angles are located adjacent the keel sidewalls, second steps having similar deadrise angles are located adjacent the side portions, and risers having steep deadrise angles interconnect the first and second steps.

U.S. Pat. No. 4,091,761 to Fehn discloses a watercraft hull shape that minimizes the tendency of the attitude of a tunnel hull boat to be affected by head or tail winds and avoids undue raising of the bow of a tunnel hull boat at high speeds. The hull contains a tunnel between the inner walls of two downwardly extending sponsons, and a center rib projecting downwardly from the bottom of the boat into the tunnel, the lower wall of which acts as a planing surface. The distance between the inner walls of the sponsons and the outer walls of the center rib decreases from the bow to an area adjacent the midpoint of the boat fore and aft and then increases abruptly after this point so as to create a venturi throat. Two flat portions adjacent the bow, which are directed upwardly in a forward direction, act as scoops to increase the lifting effect on the stern. Curved strakes of short length adjacent the bow give additional lift to the bow at low speeds.

U.S. Pat. No. Re. 36,879 to Schoell discloses a watercraft hull shape that increases lateral stability at non-planing speeds, that has lateral stability at low and planing speeds, and whose spray is directed away from occupants of the boat. The hull has a conical contour extending from the bow portion to a stern portion having a flat surface on each side of the keel, a wide lip chine having a lip portion and a transom separating the bow portion and the stern portion creating a step between the bow portion and the stern portion. A flat keel portion extends from the stern to the mid hull transom.

U.S. Pat. No. 6,631,690 to Mambretti discloses a watercraft hull shape that increases lift in relation to speed, greatly improves performance, strengthens the structure of the boat and that reacts to the lateral thrust from the water-air mixture tending to move from the keel outwards to the sides of the bottom. The deep vee hull has a number of longitudinal grooves substantially parallel and symmetrical to the keel extending from the stern approximately as far as the bow. The hull may have two, four or some other number of grooves which may be of different lengths or may appear different in cross section.

U.S. Published Patent Application No. 2009/0188419 to Lindstrom et al. discloses a watercraft hull shape having aerated longitudinal hydrosponsons with air injection into tunnels and distribution to generate bubbles across central running surfaces. The Lindstrom '419 patent application contemplates distributing air across the center hull surfaces and enhancing air flow into tunnel hull configurations outboard of the center V-hull zones. The Lindstrom '419 patent application specifically discloses a deep V-hull that extends substantially from the bow of the watercraft to the stern of the watercraft. Further, air injection into the tunnels is accomplished using air induction shields which merely permit flow of air into the tunnels through conduits.

There exists a need to provide a watercraft hull having a shape and structure that provides minimal water resistance, resulting in higher performance and improved fuel economy, together with directional stability and an acceptable angle of inclination not unreasonably susceptible to tail or head winds.

SUMMARY OF THE INVENTION

With the foregoing in mind, the present invention provides a watercraft hull that advantageously allows for minimal water resistance by virtue of a vacuum chamber. The watercraft hull according to the present invention also advantageously provides a tunnel for directional stability. The watercraft hull according to the present invention further advantageously provides a deep vee bow portion to permit an acceptable angle of inclination not susceptible to tail or head winds.

These and other objects, features and advantages according to the present invention are provided by a watercraft hull that may comprise a lower portion, an upper portion and a strake which may be positioned between the lower portion and upper portion. The upper portion may include sidewalls extending upwardly from the strake. The lower portion may include a bow portion, an aft portion having a tunnel formed therein and a medial portion that transitions the bow portion to the aft portion. The bow portion may have a v-shape defined by a keel and sidewalls extending upwardly therefrom to the strake. The aft portion may be defined by a pair of opposing sidewalls extending downwardly from the strake to a bottom portion. The tunnel formed in the aft portion may be defined by a pair of opposing tunnel sidewalls that extend upwardly from the bottom portion to a tunnel top having a center rib.

The medial portion may have a vacuum chamber extending between and transitioning the keel of the bow portion to the tunnel formed in the aft portion. The vacuum chamber may have a pair of opposing outer vacuum chamber walls that extend longitudinally from the keel of the bow portion to the bottom portion of the pair of respective opposing tunnel sidewalls. The pair of opposing outer vacuum chamber walls may have a sloping bottom that slopes from a first point having a first predetermined elevation to a second point having a second predetermined elevation that is higher than the first predetermined elevation. The first point may be defined by an end of the bow portion and a beginning of the medial portion. The second point may be defined by an end of the medial portion and a beginning of the aft portion.

The vacuum chamber may also have a pair of opposing inner vacuum chamber walls that extend upwardly from the bottom of the pair of respective opposing outer vacuum chamber walls to a vacuum chamber top. The vacuum chamber top may have a center rib that extends from the first point through a third point having a third predetermined elevation that is higher than the second predetermined elevation. The center rib of the vacuum chamber top may slope downwardly to the center rib of the tunnel top to define a continuous center rib.

The continuous center rib of the watercraft hull according to the present invention may include a pair of opposing center rib sidewalls extending downwardly from the vacuum chamber top and the tunnel top to a center rib bottom. The length of the center rib sidewalls may increase from the first point to the third point and may decrease from the third point to a transom stern. The width of the center rib bottom may increase from the first point to the transom stern.

As the watercraft hull according to the present invention is used, a flow of water may be directed aftward and a quantity of air may be mixed in with the flow of water as the watercraft hull moves through the water. The vacuum chamber may capture and compress the air from the mixture of air and water and feed the compressed air to and through the transom stern. In some embodiments of the watercraft hull according to the present invention, at least one supplemental air tube may extend from the sidewall to the vacuum chamber to provide a supplemental supply of air.

In another embodiment of the watercraft hull according to the present invention, the lower portion may include two bow portions. The aft portion may include two tunnels formed therein. The medial portion may include two vacuum chambers, each of which may transition the keel of the respective bow portions to each of the respective tunnels formed in the aft portion. At least one supplemental air tube may extend from the sidewall to each of the vacuum chambers to provide a supplemental supply of air.

A method aspect of the present invention is for incorporating a tunnel and a vacuum chamber into an existing watercraft hull. The method may include cutting out a lower portion of the existing watercraft hull. The method may also include forming a tunnel. The tunnel may be defined by a pair of opposing tunnel sidewalls that extend downwardly from a tunnel top having a center rib. The method may also include forming a vacuum chamber adapted to extend between and transition the keel to the tunnel.

The method may further include positioning a supplemental air tube to extend from the vacuum chamber to a point on the sidewall. The method may still further include drilling a hole in the sidewall to accept a first end of the supplemental air tube and drilling a hole in the vacuum chamber to accept a second end of the supplemental air tube.

The method may yet further include joining the vacuum chamber to the keel at a point on the keel where the hull has been cut out. The method may also include joining the first end of the supplemental air tube to the sidewall and joining the second end of the supplemental air tube to the vacuum chamber. The method may further include joining a first end of the tunnel to the vacuum chamber at the second point and joining a second end of tunnel to the transom stern. The method may also include joining a top of the outer tunnel wall to the hull.

DETAILED DESCRIPTION OF THE PREFERRED EMBODIMENT

Figure 1:
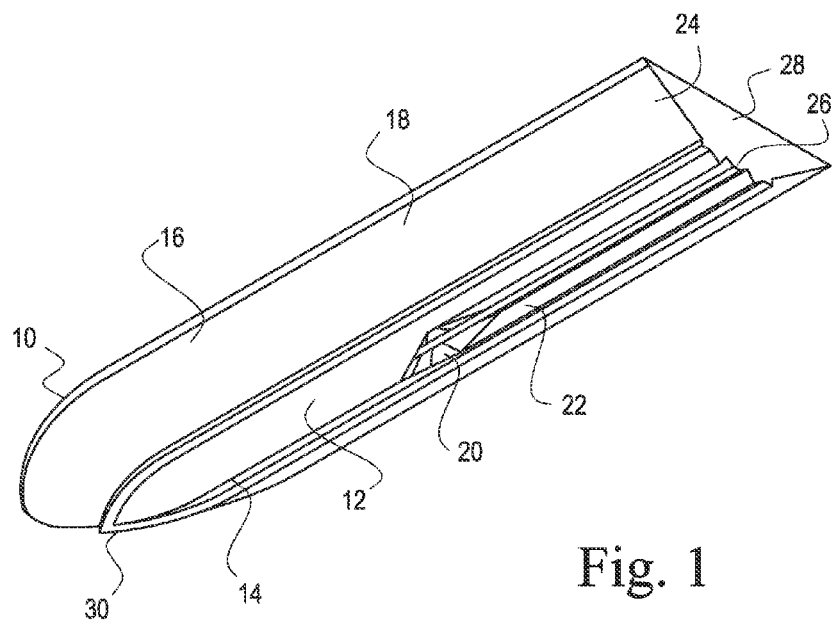
FIG. 1 is a bottom perspective view of a watercraft hull according to the present invention.
Figure 2:
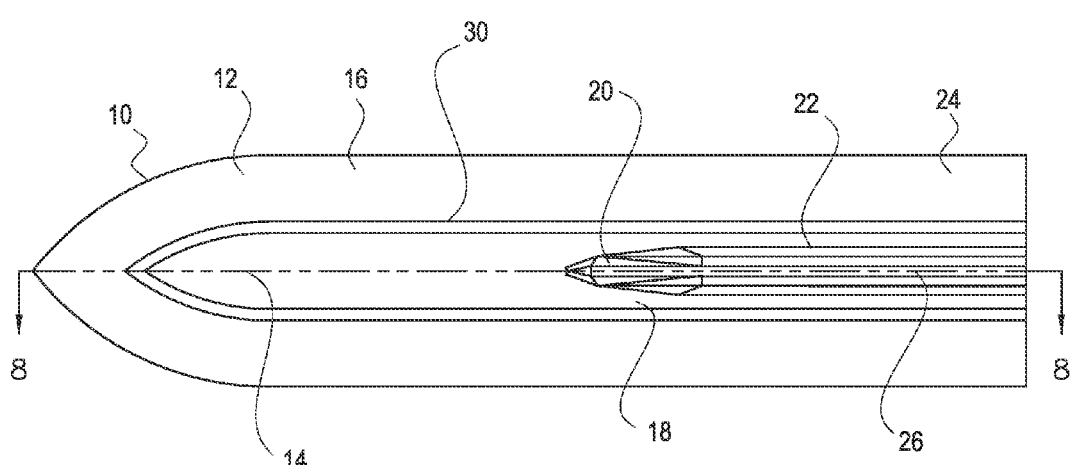
FIG. 2 is a bottom plan view of a watercraft hull according to the present invention.
Figure 3:
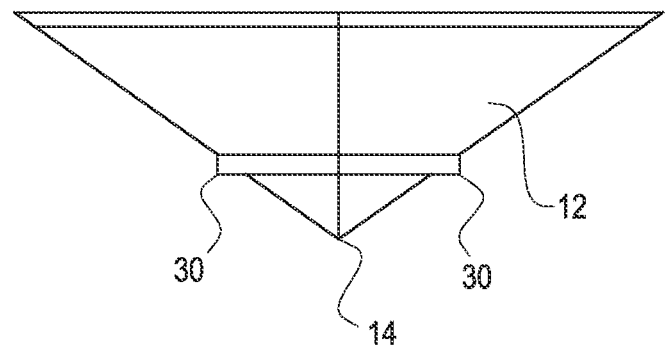
FIG. 3 is a front elevation view of a watercraft hull according to the present invention.

A watercraft using a watercraft hull 10 according to the present invention can advantageously achieve minimal water resistance, resulting in higher performance and improved fuel economy. The system according to the present invention also advantageously provides the watercraft hull 10 with greatly increased directional stability. The system according to the present invention further advantageously provides a watercraft hull 10 that achieves greater lift. The advantages of the system according to the present invention may be realized whether operating a watercraft having a completely newly fabricated watercraft hull 10 according to the present invention or operating a watercraft having a retrofitted watercraft hull 10 according to the present invention.

Referring now to FIGS. 1-9, details of the watercraft hull 10 according to the present invention are now described in greater detail. The watercraft hull 10 according to the present invention advantageously allows a user to achieve higher performance and increased fuel economy in the use of a watercraft while simultaneously enhancing directional tracking. As will be discussed in greater detail below, the unique design of the watercraft hull 10 includes a bow portion 16, a medial or transitional portion 18 and an aft portion 24. A strake 30, as understood by those skilled in the art, which may extend the length of the watercraft hull 10, is provided to stabilize water flow at high speeds. The bow portion 16 of the watercraft hull 10 according to the present invention can be any standard deep vee hull profile. After having had the benefit of reading this disclosure, those skilled in the art will appreciate that the bow portion of the watercraft hull can be either a single or multi-hull bow portion, as well as a bigger displacement hull, all of which are contemplated by the present invention.

The medial portion 18 of the watercraft hull 10 according to the present invention may be adapted to capture a quantity of air from the water flow off of the deep vee bow portion 16 of the watercraft hull 10 and pass the quantity of air through a tunnel 22 out to the aft portion 24. More specifically, and as perhaps best illustrated in FIGS. 2 and 5, the bow portion 16 of the watercraft hull 10 may be adapted to slice through the water by virtue of the deep vee bottom 12 and narrow keel 14 which, in response to forward propulsion, may create a mixture of water and air that flows back to the medial portion 18 of the watercraft hull 10. At that point, a vacuum chamber 20 may capture and compress the air from the water flow and feed the compressed air into the tunnel 22. Thereafter, the compressed air may pass to and through the aft portion 24 of the watercraft hull 10.

Referring now more specifically to FIGS. 1-9, individual portions of the watercraft hull 10 according to the present invention will now be discussed in greater detail. The bow portion 16 of the watercraft hull 10 includes a deep vee bottom 12 with a narrow keel 14. When the watercraft hull 10 is propelled forward, the deep vee bottom 12 and narrow keel 14 advantageously create a mixture of compressed air and water which flows back to the medial portion 18 of the watercraft hull 10 according to the present invention.

Figure 9:
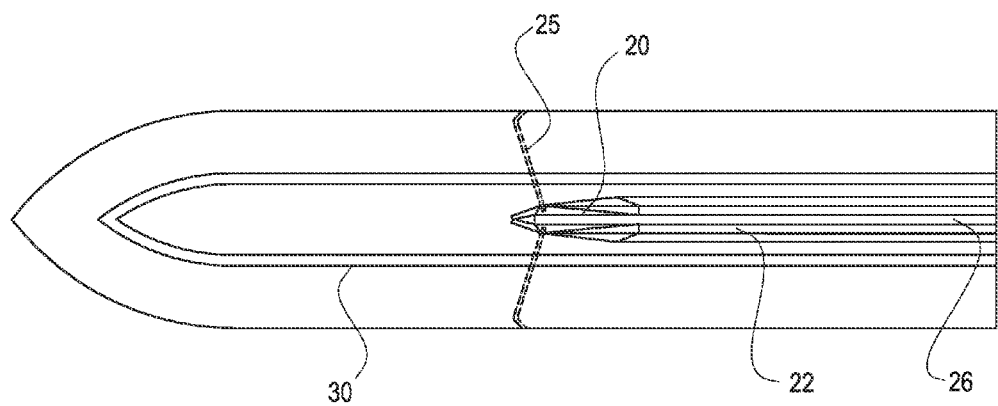
FIG. 9 is a bottom plan view of a watercraft hull according to the present invention showing supplemental air introduction tubes to introduce air into a vacuum chamber.

The medial portion 18 of the watercraft hull 10 is connected to and extends from the bow portion 16 and the aft portion 24 of the watercraft hull 10. The medial portion 18 of the watercraft hull 10 transitions from a deep vee bottom to a tunnel hull with a vacuum chamber between the two bottom types. More specifically, the medial portion 18 may illustratively include at least one air pocket or vacuum chamber 20 located along the keel line, at or around the point of transition from deep vee bottom 12 to tunnel hull 22, which vacuum chamber 20 advantageously captures and compresses the mixture of air and water created by the bow portion 16 as a consequence of forward propulsion, as perhaps best illustrated in FIG. 8. Optionally, the medial portion 18 may include supplemental air tubes 25 for introduction of air into the vacuum chamber 20 as illustrated in FIG. 9. The medial portion 18 may include at least one tunnel 22 formed therein adjacent to and connected to the vacuum chamber 20 which carries the compressed air and water mixture to and through the aft portion of the watercraft hull 10. The illustrated embodiment of the watercraft hull 10 shows that one tunnel 22 is formed in the medial portion 18 thereof and extends from the vacuum chamber 20 to and through the aft portion 24 of the watercraft hull 10.

The vacuum chamber 20 formed in the medial portion 18 begins at a first point on the keel line 27 and may transition to a third point 29 at a higher elevation as the vacuum chamber 20 proceeds toward the aft portion 24. The vacuum chamber 20 may then transition to a second point 32 at a lower elevation consistent with the point of elevation of the tunnel 22. The vacuum chamber 20 may become wider as it proceeds toward the aft portion 24 until it intersects with the tunnel 22 at the second point 32 and assumes the width of the tunnel 22. A center rib 26 projects downwardly from the bottom of the boat into the vacuum chamber 20 and tunnel 22.

Figures 6, 7:
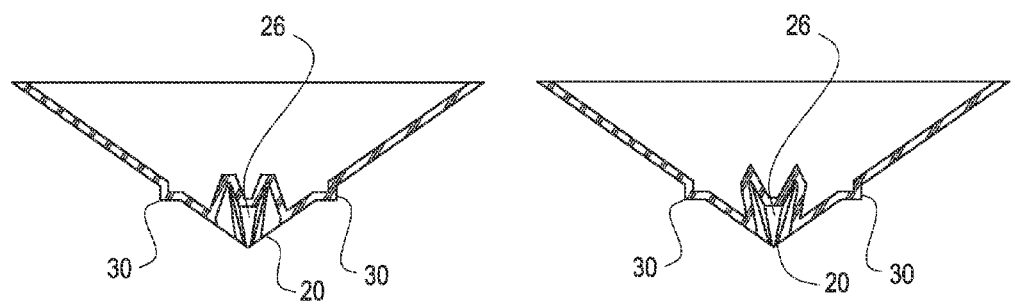
FIG. 6 is a cross sectional view of a watercraft hull according to the present invention taken through line 6-6 in FIG. 5.
FIG. 7 is a cross sectional view of a watercraft hull according to the present invention taken through line 7-7 in FIG. 5.
Figure 8:
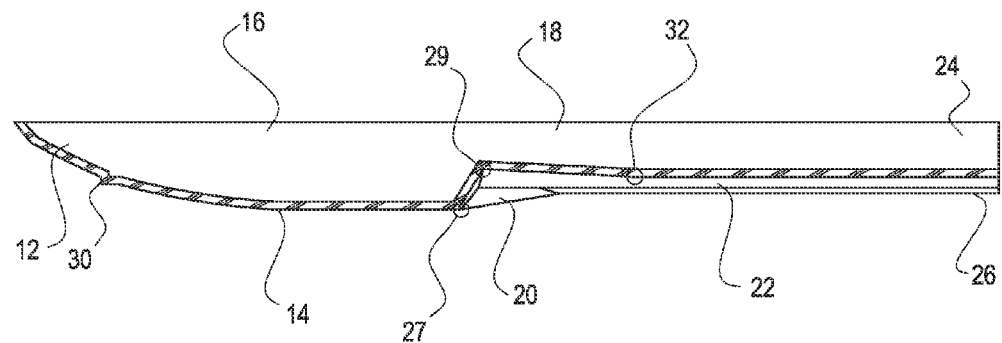
FIG. 8 is a cross sectional view of a watercraft hull according to the present invention taken through line 8-8 in FIG. 2.

FIG. 6 illustrates a cross-section of the vacuum chamber 20 at a point between the highest point of elevation of the vacuum chamber 20 and the elevation of the tunnel 22. FIG. 7 illustrates a cross-section of the vacuum chamber 20 at a point between the keel line 14 and the highest point of elevation of the vacuum chamber 20. Accordingly, FIGS. 6 and 7 illustrate the transition from deep vee bottom 12 to vacuum chamber 20 to tunnel 22. This transition advantageously reduces drag on the watercraft hull and provides a narrower and more elongated wetted surface. This is important because it permits the use of much less power to propel a watercraft incorporating the watercraft hull 10 according to the present invention to achieve normal operating speeds while allowing for better longitudinal stability. After having had the benefit of reviewing this disclosure, those skilled in the art will appreciate that the location of the vacuum chamber 20, height of the vacuum chamber 20, width of the vacuum chamber 20, height of the tunnel 22, width of the tunnel 22 and length of the tunnel 22 may vary according to multiple variables including, but not limited to, the weight, length and riding attitude of the hull, while still accomplishing the goals, features and objectives according to the present invention.

Figure 4:
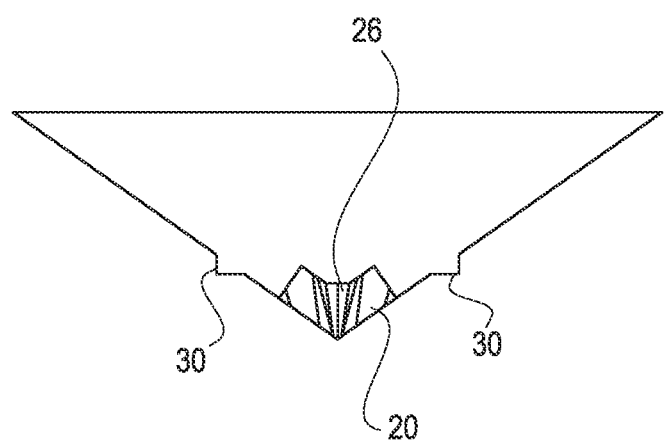
FIG. 4 is a rear elevation view of a watercraft hull according to the present invention.
Figure 5:
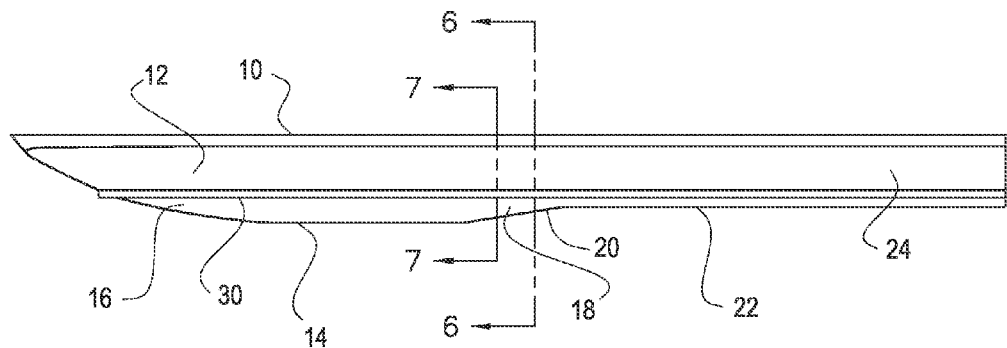
FIG. 5 is a side elevation view of a watercraft hull according to the present invention.

Referring additionally to FIG. 1, the aft portion 24 of the watercraft hull 10 is now described in greater detail. The aft portion 24 of the watercraft hull 10 includes sidewalls, a tunnel 22 and a transom stern 28. The tunnel 22 commences at the posterior end of the vacuum chamber 20 and extends out through the transom stern 28. A center rib 26 projects downwardly from the bottom of the watercraft into the tunnel 22. FIG. 4 illustrates the tunnel 22 as viewed from the transom stern 28. The watercraft hull 10 according to the present invention advantageously reduces hydrodynamic drag by virtue of the pressurization of the air and water mixture passing through the tunnel 22.

The medial portion 18 and aft portion 24 of an existing watercraft may be retrofitted to provide a watercraft hull 10 according to the present invention. The existing watercraft may be modified so as to remove the portion of the hull on either side of the keel line from a predetermined point on the keel line rearward all the way through the transom stern. A prefabricated vacuum chamber 20 and tunnel hull 22 may then be mated to the existing watercraft, which may involve re-glazing a fiberglass watercraft, so as to provide a watercraft hull 10 according to the present invention. After having had the benefit of reviewing this disclosure, those skilled in the art will appreciate that the location of the vacuum chamber 20, height of the vacuum chamber 20, width of the vacuum chamber 20, height of the tunnel 22, width of the tunnel 22 and length of the tunnel 22 may vary according to multiple variables including, but not limited to, the weight, length and riding attitude of the existing watercraft, while still accomplishing the goals, features and objectives according to the present invention.

After having had the benefit of reviewing this disclosure, those skilled in the art will appreciate that the watercraft hull 10 according to the present invention, having been described above latitudinally, may also be described longitudinally. Accordingly, the watercraft hull 10 may include a lower portion, an upper portion and a strake 30 which may be positioned between the lower portion and upper portion. The upper portion may include sidewalls extending upwardly from the strake 30. The lower portion may include a bow portion 16, an aft portion 24 having a tunnel 22 formed therein and a medial portion 18 that transitions the bow portion to the aft portion. The bow portion 16 may have a v-shape defined by a keel 14 and sidewalls extending upwardly therefrom to the strake 30. Those skilled in the art will appreciate that the watercraft hull 10 according to the present invention is contemplated without a strake, and that the strake, when used, defines a midway point of the sidewalls of the watercraft hull adjacent the aft portion and the bow portion thereof.

The aft portion 24 may be defined by a pair of opposing sidewalls extending downwardly from the strake 30 to a bottom portion. The tunnel 22 formed in the aft portion 24 may be defined by a pair of opposing tunnel sidewalls that extend upwardly from the bottom portion to a tunnel top having a center rib 26.

The medial portion 18 may have a vacuum chamber 20 extending between and transitioning the keel 14 of the bow portion 16 to the tunnel 22 formed in the aft portion 24. The vacuum chamber 20 may have a pair of opposing outer vacuum chamber walls that extend longitudinally from the keel 14 of the bow portion 16 to the bottom portion of the pair of respective opposing tunnel sidewalls. The pair of opposing outer vacuum chamber walls may have a sloping bottom that slopes from a first point 27 having a first predetermined elevation to a second point 32 having a second predetermined elevation that is higher than the first predetermined elevation. The first point 27 may be defined by an end of the bow portion 16 and a beginning of the medial portion 18. The second point 32 may be defined by an end of the medial portion 18 and a beginning of the aft portion 24.

The vacuum chamber 20 may also have a pair of opposing inner vacuum chamber walls that extend upwardly from the bottom of the pair of respective opposing outer vacuum chamber walls to a vacuum chamber top. The vacuum chamber top may have a center rib 26 that extends from the first point 27 through a third point having a third predetermined elevation that is higher than the second predetermined elevation. The center rib 26 of the vacuum chamber top may slope downwardly to the center rib 26 of the tunnel top to define a continuous center rib 26.

The continuous center rib 26 of the watercraft hull 10 according to the present invention may include a pair of opposing center rib sidewalls extending downwardly from the vacuum chamber top and the tunnel top to a center rib bottom. The length of the center rib sidewalls may increase from the first point 27 to the third point and may decrease from the third point to a transom stern 28. The width of the center rib bottom may increase from the first point 27 to the transom stern 28.

As the watercraft hull 10 according to the present invention is used, a flow of water may be directed aftward and a quantity of air may be mixed in with the flow of water as the watercraft hull moves through the water. The vacuum chamber 20 may capture and compress the air from the mixture of air and water and feed the compressed air to and through the transom stern 28. In some embodiments of the watercraft hull 10 according to the present invention, at least one supplemental air tube 25 may extend from the sidewall to the vacuum chamber 20 to provide a supplemental supply of air. As illustrated, however, the preferred embodiment of the watercraft hull 10 according to the present invention may include a pair of opposing supplemental air tubes 25 that extend from the sidewalls of the watercraft hull inwardly to the vacuum chamber 20.

In another embodiment of the watercraft hull according to the present invention, the lower portion may include two bow portions 16. The aft portion 24 may include two tunnels 22 formed therein. The medial portion 18 may include two respective vacuum chambers 20, each of which may transition the keel 14 of the respective bow portions 16 to each of the respective tunnels 22 formed in the aft portion 24. At least one supplemental air tube 25 may extend from the sidewall to each of the vacuum chambers 20 to provide a supplemental supply of air. After having had the benefit of reviewing this disclosure, those skilled in the art will appreciate that the watercraft hull 10 according to the present invention, while described above as being provided in a single hull or monohull watercraft, may be provided in a multi-hull watercraft, such as, for example, a catamaran or a trimaran, while still accomplishing the goals, features and objectives according to the present invention. The multi-hull watercraft, in which the watercraft hull 10 according to the present invention may be provided, may be defined by at least two hulls joined together by a structure or framework above the waterline.

The individual hulls comprising the multi-hull watercraft, in which the watercraft hull 10 according to the present invention may be provided, may comprise a lower portion, an upper portion and a strake 30 which may be positioned between the lower portion and upper portion. The upper portion of each of the individual hulls of the multi-hull watercraft preferably has a structure as described above. The lower portion of each of the individual hulls of the multi-hull watercraft according to an embodiment of the present invention may include a bow portion 16, an aft portion 24 having a tunnel 22 formed therein and a medial portion 18 having a vacuum chamber 20 therein that transitions the bow portion of each of the individual hulls to the aft portion of each of the individual hulls. The aft portion, the tunnel, the medial portion, and the vacuum chamber of each of the individual hulls have a structure as described above and, as such, need no further discussion herein. The bow portion of each of the individual hulls may have a v-shape, a half-v-shape, any other suitable shape, or any combination of suitable bow shapes, while still accomplishing the goals, features and objectives according to the present invention. The v-shape bow portion of each of the individual hulls may be defined by a keel and sidewalls extending upwardly therefrom to the strake. The half-v-shape bow portion of each of the individual hulls may be defined by a sidewall slopingly ascending from a keel to the strake on an outboard side thereof and an opposing sidewall ascending substantially vertically from the keel to the strake on an inboard side thereof.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

That which is claimed is:

1. A watercraft hull comprising:
    a lower portion;
    an upper portion; and
    a strake positioned between the lower portion and the upper portion;
    wherein the lower portion includes
        a bow portion having a v-shape defined by a keel and sidewalls extending upwardly therefrom to the strake,
        an aft portion having a tunnel formed therein, the aft portion being defined by a pair of opposing sidewalls extending downwardly from the strake to a bottom portion, and the tunnel being defined by a pair of opposing tunnel sidewalls that extend upwardly from the bottom portion to a tunnel top having a center rib, and
        a medial portion defined by a pair of opposing sidewalls extending downwardly from the strake to a point adjacent a bottom portion of the bow sidewall and the bottom portion of the aft sidewall to define a continuous sidewall, the medial portion transitioning the bow portion to the aft portion, and having a vacuum chamber extending between and transitioning the keel of the bow portion to the tunnel formed in the aft portion, the vacuum chamber having a pair of opposing outer vacuum chamber walls that
extend longitudinally from the keel of the bow portion to the bottom portion of the pair of respective opposing tunnel sidewalls, the pair of opposing outer vacuum chamber walls having a sloping bottom that slopes from a first point having a first predetermined elevation and defined by an end of the bow portion and a beginning of the medial portion, to a second point having a second predetermined elevation that is higher than the first predetermined elevation and that is defined by an end of the medial portion and a beginning of the aft portion, and a pair of opposing inner vacuum chamber walls that extend upwardly from the bottom of the pair of respective opposing outer vacuum chamber walls to a vacuum chamber top having a center rib that extends from the first point through a third point having a third predetermined elevation that is higher than the second predetermined elevation, the center rib of the vacuum chamber top sloping downwardly to the center rib of the tunnel top to define a continuous center rib; and wherein the upper portion includes sidewalls extending upwardly from the strake.

2. A watercraft hull according to claim 1 wherein the continuous center rib includes a pair of opposing center rib sidewalls extending downwardly from the vacuum chamber top and the tunnel top to a center rib bottom.

3. A watercraft hull according to claim 2 wherein the center rib sidewalls have a length that increases from the first point to the third point and decreases from the third point to a transom stern.

4. A watercraft hull according to claim 3 wherein the center rib bottom has a width that increases from the first point to the transom stern.

5. A watercraft hull according to claim 1 wherein at least one supplemental air tube extends from the sidewall to the vacuum chamber.

6. A watercraft hull according to claim 1 wherein a flow of water is directed aftward as the watercraft hull moves through water;
wherein a quantity of air is mixed in with the flow of water as the watercraft hull moves through the water;
wherein the vacuum chamber captures and compresses the air from the mixture of air and water and feeds the compressed air into the tunnel; and
wherein the compressed air passes to and through a transom stern.

7. A watercraft hull comprising:
a lower portion; and
an upper portion;
wherein the lower portion includes
at least one bow portion having a v-shape defined by a keel and sidewalls extending upwardly therefrom to a midway point between the keel and a top surface of the upper portion,
an aft portion having at least one tunnel formed therein, the aft portion being defined by sidewalls extending downwardly from the midway point to a bottom portion, and the tunnel being defined by a pair of opposing tunnel sidewalls that extend upwardly from the bottom portion to a tunnel top having a center rib, and
a medial portion defined by a pair of opposing sidewalls extending downwardly from the midway point to a point adjacent a bottom portion of the bow sidewall and the bottom portion of the aft sidewall to define a continuous sidewall, the medial portion transitioning the bow portion to the aft portion, and having at least one vacuum chamber extending between and transitioning the keel of the bow portion to the tunnel formed in the aft portion, the vacuum chamber having
a pair of opposing outer vacuum chamber walls that extend longitudinally from the keel of the bow portion to the bottom portion of the pair of respective opposing tunnel sidewalls, the pair of opposing outer vacuum chamber walls having a sloping bottom that slopes from a first point having a first predetermined elevation and defined by an end of the bow portion and a beginning of the medial portion, to a second point having a second predetermined elevation that is higher than the first predetermined elevation and that is defined by an end of the medial portion and a beginning of the aft portion,
a pair of opposing inner vacuum chamber walls that extend upwardly from a bottom of the pair of respective opposing outer vacuum chamber walls to a vacuum chamber top having a center rib that extends from the first point through a third point having a third predetermined elevation that is higher than the second predetermined elevation, the center rib of the vacuum chamber top sloping downwardly from the third point to the center rib of the tunnel top to define a continuous center rib, and
at least one supplemental air tube extending from an outer portion of the sidewall to the vacuum chamber;
wherein the upper portion includes sidewalls extending upwardly from the midway point.

8. A watercraft hull according to claim 7 wherein the lower portion includes two bow portions, the aft portion includes two respective tunnels formed therein, and the medial portion includes two respective vacuum chambers.

9. A watercraft hull according to claim 7 wherein a strake is positioned between the lower portion and the upper portion adjacent the midway point, the strake extending substantially a length of the watercraft hull.

10. A watercraft hull according to claim 7 wherein the continuous center rib includes a pair of opposing center rib sidewalls extending downwardly from the vacuum chamber top and the tunnel top to a center rib bottom.

11. A watercraft hull according to claim 10 wherein the center rib sidewalls have a length that increases from the first point to the third point and decreases from the third point to a transom stern.

12. A watercraft hull according to claim 11 wherein the center rib bottom has a width that increases from the first point to the transom stern.

13. A watercraft hull according to claim 7 wherein a flow of water is directed aftward as the watercraft hull moves through water;
wherein a quantity of air is mixed in with the flow of water as the watercraft hull moves through the water;
wherein the vacuum chamber captures and compresses the air from the mixture of air and water and feeds the compressed air into the tunnel; and
wherein the compressed air passes to and through a transom stern.

14. A method of incorporating a tunnel and a vacuum chamber into an existing watercraft hull, the existing watercraft hull including a keel, a pair of opposing sidewalls extending upwardly from the keel and a transom stern, the keel slopingly descending aftward from a foremost point of a deck to the transom stern, the sidewalls slopingly ascending upward from the keel to form a v-shape, the method comprising:

cutting out a lower portion of the hull;

forming a tunnel, the tunnel being defined by a pair of opposing tunnel sidewalls that extend downwardly from a tunnel top having a center rib;

forming a vacuum chamber, the vacuum chamber being adapted to extend between and transition the keel of the existing watercraft hull to the tunnel when the tunnel is incorporated into the existing watercraft hull, the vacuum chamber having a pair of opposing outer vacuum chamber walls that are adapted to extend longitudinally from the keel of the existing watercraft hull to a bottom portion of the pair of respective opposing tunnel sidewalls, the pair of opposing outer vacuum chamber walls having a sloping bottom that slopes from a first point having a first predetermined elevation, to a second point having a second predetermined elevation that is higher than the first predetermined elevation and that is defined by a beginning of the tunnel, and having a pair of opposing inner vacuum chamber walls that extend upwardly from a bottom of the pair of respective opposing outer vacuum chamber walls to a vacuum chamber top having a center rib that begins at a third point having a third predetermined elevation that is higher than the second predetermined elevation, the center rib of the vacuum chamber top sloping downwardly from the third point to the center rib of the tunnel top to define a continuous center rib;

positioning a supplemental air tube into a passageway formed through the sidewalls of the existing watercraft hull to extend from the vacuum chamber to a point on the sidewall of the existing watercraft hull;

joining the vacuum chamber to the keel of the existing watercraft hull at a point on the keel where the existing watercraft hull has been cut out;

joining a first end of the tunnel to the vacuum chamber at the second point;

joining a second end of the tunnel to the transom stern of the existing watercraft hull; and joining a top of the outer tunnel wall to the existing watercraft hull.

15. A method according to claim 14 wherein the center rib sidewalls have a length that increases from the first point to the third point and decreases from the third point to the transom stern.

16. A method according to claim 15 wherein the center rib bottom has a width that increases from the first point to the transom stern.

17. A method according to claim 14 further comprising directing a flow of water aftward as the existing watercraft hull having the tunnel and vacuum chamber incorporated therein moves through water;

mixing a quantity of air in with the flow of water as the hull moves through the water;

capturing and compressing the air from the mixture of air and water and feeding the compressed air into the tunnel; and passing the compressed air to and through the transom stern.

* * * * *